US011118638B2

(12) United States Patent
Takahashi et al.

(10) Patent No.: US 11,118,638 B2
(45) Date of Patent: Sep. 14, 2021

(54) REVERSE INPUT LOCK CLUTCH

(71) Applicant: Tok, Inc., Tokyo (JP)

(72) Inventors: Daisuke Takahashi, Tokyo (JP); Makoto Sekine, Tokyo (JP)

(73) Assignee: TOK, INC., Tokyo (JP)

( * ) Notice: Subject to any disclaimer, the term of this patent is extended or adjusted under 35 U.S.C. 154(b) by 32 days.

(21) Appl. No.: 16/641,817

(22) PCT Filed: Sep. 5, 2017

(86) PCT No.: PCT/JP2017/032009
§ 371 (c)(1),
(2) Date: Feb. 25, 2020

(87) PCT Pub. No.: WO2019/049220
PCT Pub. Date: Mar. 14, 2019

(65) Prior Publication Data
US 2020/0393006 A1 Dec. 17, 2020

(51) Int. Cl.
*F16D 41/20* (2006.01)
*F16D 41/02* (2006.01)
*E06B 9/322* (2006.01)

(52) U.S. Cl.
CPC ........... *F16D 41/206* (2013.01); *F16D 41/02* (2013.01); *E06B 9/322* (2013.01)

(58) Field of Classification Search
CPC ......... F16D 41/02; F16D 41/206; E06B 9/322
See application file for complete search history.

(56) References Cited

U.S. PATENT DOCUMENTS

| 7,520,310 B2 * | 4/2009 | Colosio | E06B 9/307 |
| | | | 160/168.1 P |
| 2010/0186907 A1 * | 7/2010 | Kraler | E06B 9/307 |
| | | | 160/176.1 P |
| 2015/0184458 A1 * | 7/2015 | Zhang | E06B 9/322 |
| | | | 160/133 |

FOREIGN PATENT DOCUMENTS

| JP | 06-147234 A | 5/1994 |
| JP | 2008-214936 A | 9/2008 |
| JP | 2012-122585 A | 6/2012 |
| JP | 2014-020179 A | 2/2014 |
| JP | 2015-528078 A | 9/2015 |
| JP | 2017-122489 A | 7/2017 |

OTHER PUBLICATIONS

English International Search Report for corresponding PCT/JP2017/032009, dated Dec. 12, 2017 (1 page).

* cited by examiner

*Primary Examiner* — David R Morris
*Assistant Examiner* — Lori Wu
(74) *Attorney, Agent, or Firm* — Flynn Thiel, P.C.

(57) ABSTRACT

A reverse input lock clutch has a fitting portion of a spring stopper rotatably fitted in a cylindrical dent formed by being surrounded by an inner diameter portion on an end surface of an output member on a side opposite to a fixed member. A locking portion rotates with the fitting portion while having one end of a first elastic member locked by a holder groove. Adjustment of the rotation position of the lock portion with respect to the output member is made by rotating the fitting portion within a range of a groove length of an adjustment groove with respect to the output member and anchoring an adjustment pin at a desired rotation position to the adjustment pin fixing portion so as to fix the fitting portion on the output member.

6 Claims, 9 Drawing Sheets

REVERSE INPUT LOCK CLUTCH

TECHNICAL FIELD

The present invention relates to a reverse input lock clutch which transmits a rotational driving force input into an input member from two directions, i.e., one direction and the other direction to an output member and prevents transmission of the rotational driving force to the input member reversely input into the output member from a predetermined direction.

BACKGROUND ART

This type of reverse input lock clutch includes the one used in an operating device of a blind disclosed in Patent Literature 1, for example. The reverse input lock clutch in this operating device includes an input shaft into which rotation from a pulley is input and a rotation shaft coaxial with this input shaft and capable of transmitting the rotation to a driving shaft. A clutch spring is wound across both a fixed spring winding shaft of a case and a rotating spring winding shaft of the rotation shaft. The rotation shaft and the case are switched between connection and non-connection by using tightening and loosening of the clutch spring. One end of the clutch spring is locked in a lock groove formed on a notch portion on an outer periphery of a spring receiving portion of the rotation shaft, while the other end is locked by a spring receiver rotatably and externally fitted on the fixed spring winding shaft. A plurality of lock grooves are formed on the spring receiver, and the other end of the clutch spring is locked in one of the lock grooves selected from them.

When rotation in one direction which raises a shielding material of the blind is input into the input shaft, the one end of the clutch spring is pressed to the one direction by the input shaft and the rotation shaft, and the clutch spring is loosened and is made rotatable. When the rotation in the other direction which lowers the shielding material of the blind is input into the input shaft, the other end of the clutch spring is pressed to the other direction by the input shaft and the spring receiver, and the clutch spring is loosened and is made rotatable. Moreover, when rotation in the other direction is reversely input into the rotation shaft from the driving shaft, the one end of the clutch spring is pressed to the other direction, the clutch spring is tightened to the fixed spring winding shaft, and the rotation of the rotation shaft is locked.

PRIOR ART DOCUMENTS

Patent Literature

Patent Literature 1: Japanese Patent Laid-Open No. 2008-214936

SUMMARY OF INVENTION

Technical Problem

With the reverse input lock clutch using the conventional clutch spring as disclosed in Patent Literature 1, a phase angle formed by an end portion of the spring around a shaft core of the spring and an inner diameter dimension of the spring are not fixed due to an influence of working accuracy at manufacture of the clutch spring. Thus, in the conventional reverse input lock clutch, the phase angle of the spring end portion is adjusted by forming a plurality of the lock grooves in the spring receiver and by having the other end of the clutch spring locked in the one lock groove selected from them. However, the phase angle adjustment of the spring end portion can be made only discretely due to presence of an interval between each of the plurality of lock grooves, and adjustment to an optimal phase angle is difficult in some cases. In such a case, the worked clutch springs need to be sorted or readjusted, and the clutch spring is hard to be handled as a component of the reverse input lock clutch in a way.

Moreover, in the conventional reverse input lock clutch disclosed in Patent Literature 1, when the rotation in the one direction is input into the input shaft, a pressing piece of the input shaft needs to be first brought into contact with the notch portion of the rotation shaft so as to press the one end of the clutch spring to the one direction, while when the rotation in the other direction is input into the input shaft, the pressing piece of the input shaft needs to be first brought into contact with the notch portion of the spring receiver so as to press the other end of the clutch spring. Thus, in the conventional reverse input lock clutch, components need to be arranged so that circumferential positions of the notch portion of the rotation shaft and the notch portion of the spring receiver are shifted from each other by a predetermined length.

Solution to Problem

The present invention was made in order to solve such problems and is a reverse input lock clutch including: a fixed member which is fixedly provided; an output member which is pivotally supported rotatably by the fixed member and outputs a rotational driving force; an input member which transmits the input rotational driving force to the output member; and a first elastic member which is provided across the fixed member and the output member, enables rotation of the output member by being loosened, and locks the rotation of the output member by being tightened. The reverse input lock clutch includes: a stopper having a fitting portion rotatably fitted with an end surface of the output member on a side opposite to the fixed member and a locking portion rotating with the fitting portion while locking one end of the first elastic member; and a fixing tool which sets a rotation position of the locking portion with respect to the output member at an arbitrary position so as to fix the stopper on the end surface of the output member. The fixed member has a fixed shaft installed upright, and the output member has a protrusion formed on the end surface with protruding in an axial direction of the output member and an outer diameter portion coaxially juxtaposed with the fixed shaft. The first elastic member covers each of outer peripheries of the outer diameter portion and the fixed shaft, and protrudes from the outer periphery of the first elastic member on one end on an end surface side of the output member and on the other end on a root side of the fixed shaft so that the first elastic member is loosened when the other end is pushed to a direction or the one end is pushed to the other direction. The input member has a bottomed cylindrical shape with a side peripheral wall covering the outer periphery of the elastic member. On the side peripheral wall, a first notch portion notched in the circumferential direction by a predetermined length and surrounding the end portion of the locking portion and a second notch portion notched in the circumferential direction by a predetermined length and surrounding the other end of the first elastic member are formed. On a bottom surface of the input member opposed to the end surface of the output member, an engagement groove opened in the circumferential direction by a predetermined length and surrounding the protrusion is formed. Each notch of the first notch portion and the second notch portion and an opening of the engagement groove are formed with such mutual positional relations and circumferential lengths that: when the input member is rotated to a direction and the one circumferential end portion of the second notch portion is brought into contact with the other end of the first elastic member, one circumferential end portion of the engagement groove is not brought into contact with the protrusion, and the other circumferential end portion of the first notch portion is not brought into contact with the locking portion; when the input member is rotated to the other direction and the other circumferential end portion of the engagement groove is brought into contact with the protrusion, the one circumferential end portion of the first notch portion is not brought into contact with the locking portion, and the other circumferential end portion of the second notch portion is not brought into contact with the other end of the first elastic member; or when the input member is rotated to the other direction, and the one circumferential end portion of the first notch portion is brought into contact with the locking portion, the other circumferential end portion of the engagement groove is not brought into contact with the protrusion, and the other circumferential end portion of the second notch portion is not brought into contact with the other end of the first elastic member.

According to this configuration, when the rotational driving force in the one direction is input into the input member, the one circumferential end portion of the second notch portion formed on the side peripheral wall of the input member is brought into contact with the other end of the first elastic member and presses the other end to the one direction. As a result, the first elastic member is loosened. Subsequently, the one circumferential end portion of the engagement groove formed on the bottom surface of the input member is brought into contact with the protrusion formed on the end surface of the output member and presses the protrusion to the one direction, and the rotational driving force in the one direction given to the input member is transmitted to the output member. Moreover, when the rotational driving force in the other direction is input into the input member, the other circumferential end portion of the engagement groove is brought into contact with the protrusion or the one circumferential end portion of the first notch portion formed on the side peripheral wall of the input member is brought into contact with the locking portion of the stopper, and the locking portion presses the one end of the first elastic member to the other direction. As a result, the first elastic member is loosened. Subsequently, the other circumferential end portion of the engagement groove is brought into contact with the protrusion and presses the protrusion to the other direction or the one circumferential end portion of the first notch portion is brought into contact with the locking portion of the stopper and presses the locking portion to the other direction, and the rotational driving force in the other direction given to the input member is transmitted to the output member.

On the other hand, when the rotational driving force in the one direction is reversely input into the output member, the locking portion of the stopper fixed to the output member presses the one end of the first elastic member in the one direction. As a result, the first elastic member is tightened to each of the outer peripheries of the outer diameter portion of the output member and the fixed shaft of the fixed member, and the rotation of the output member is locked. At this time, the locking portion is not brought into contact with the one circumferential end portion of the first notch portion. Moreover, when the rotational driving force in the other direction is given to the output member, the locking portion of the stopper presses the one end of the first elastic member to the other direction. As a result, the first elastic member is loosened. Subsequently, the protrusion presses the one circumferential end portion of the engagement groove to the other direction or the one circumferential end portion of the first notch portion presses the locking portion of the stopper to the other direction, and the rotational driving force in the other direction given to the output member is transmitted to the input member. At this time, the locking portion is not brought into contact with the other circumferential end portion of the first notch portion.

The phase angle adjustment of the end portion of the elastic member in the reverse input lock clutch operating as above can be made by having the rotation position of the locking portion with respect to the output member set at an arbitrary position and by fixing the stopper on the end surface of the output member by the fixing tool. Since the locking portion can continuously rotate with respect to the output member, unlike the conventional reverse input lock clutch which discretely locks the spring end portion in one of the plurality of lock grooves, the phase angle adjustment can be made so that the end portion of the elastic member comes to the optimal rotation position. Thus, handleability of the elastic member as a component of the reverse input lock clutch is improved, and conventional labor such as component sorting and readjusting is no longer necessary.

Moreover, the first notch portion and the second notch portion as well as the engagement groove are formed on one component of the input member and thus, their mutual positional relations are determined at manufacture of the components of the input member and can be set with accuracy. Thus, it is no longer necessary to arrange each component so that the circumferential positions of each of the notch portions of the rotation shaft and the spring receiver are shifted from each other by a predetermined length, and the reverse input lock clutch can be assembled regardless of the arrangement relations among the components.

Moreover, the present invention is characterized in that a plurality of the protrusions are formed in the circumferential direction of the end surface of the output member, a plurality of the engagement grooves surrounding each of the protrusions is formed on the bottom surface of the input member, and the locking portion of the stopper passes between the adjacent protrusions and reaches the first notch portion.

According to this configuration, since the transmission of the rotational driving force between the input member and the output member is made by the plurality of protrusions and engagement grooves arranged in the circumferential direction, it is performed stably. Moreover, since the locking portion of the stopper has a structure that the locking portion of the stopper passes between the adjacent protrusions, a dimension occupied by the stopper in the axial direction is accommodated in the protruding height of the protrusion, and the dimension of the reverse input lock clutch in the axial direction can be made smaller.

Moreover, the present invention is characterized in that an adjustment groove is formed on the side surface of the fitting portion of the stopper opposed to the end surface of the output member so as to open by a predetermined length in the circumference direction, and the fixing portion is formed on the output member so as to anchor the fixing tool inserted through the adjustment groove.

According to this configuration, the adjustment of the rotation position of the locking portion with respect to the output member is made by rotating the fitting portion of the stopper within a range of the circumferential length of the adjustment groove with respect to the output member and anchoring the fixing tool inserted through the adjustment groove at a desired rotation position to the fixing portion formed on the output member so as to fix the fitting portion on the output member.

Moreover, the present invention is characterized in that:

a through hole is formed in a shaft core direction of the fixed shaft of the fixed member; and the output member is configured by a first output member having the outer periphery portion and the protrusion and a second output member inserted through the through hole and pivotally supported rotatably by the through hole, the second output member having one end portion fixed to the first output member by the fixing tool and the other end portion formed with a retainer from the through hole.

According to this configuration, mounting of the output member to the fixed member is performed by inserting the second output member into the through hole of the fixed shaft from the one end portion side and by fixing the one end portion of the second output member coming out of the through hole by the fixing tool to the first output member together with the stopper.

Moreover, the present invention includes a second elastic member formed by being wound in a direction opposite to a winding direction of the first elastic member. The second elastic member enables rotation of the output member by being loosened when the other end is pressed to the other direction or one end is pressed to the one direction, and locks reverse rotation of the output member by being tightened. The second elastic member covers each of outer peripheries of the outer diameter portion and the fixed shaft, and has one end on the end surface side of the output member and the other end on the root side of the fixed shaft protruding from the outer periphery. The locking portion of the stopper rotates with the fitting portion while locking the one end of the second elastic member. A third notch portion notched in the circumferential direction by a predetermined length and surrounding the other end of the second elastic member is formed on the side peripheral wall of the input member. Each notch of the first notch portion and the third notch portion and the opening of the engagement groove are formed with such mutual positional relations and circumferential lengths that: when the input member is rotated to the other direction and the one circumferential end portion of the third notch portion is brought into contact with the other end of the second elastic member, the other circumferential end portion of the engagement groove is not brought into contact with the protrusion, and the one circumferential end portion of the first notch portion is not brought into contact with the locking portion; when the input member is rotated to the one direction and the one circumferential end portion of the engagement groove is brought into contact with the protrusion, the other circumferential end portion of the first notch portion is not brought into contact with the locking portion, and the other circumferential end portion of the third notch portion is not brought into contact with the other end of the second elastic member; or when the input member is rotated to the one direction and the other circumferential end portion of the first notch portion is brought into contact with the locking portion, the one circumferential end portion of the engagement groove is not brought into contact with the protrusion, and the other circumferential end portion of the third notch portion is not brought into contact with the other end of the second elastic member.

According to this configuration, by configuring the reverse input lock clutch by using the second elastic member instead of the first elastic member, when the rotational driving force in the other direction is input into the output member, the reverse rotation of the output member is locked. That is, when the rotational driving force in the other direction is input into the output member, the locking portion of the stopper fixed to the output member presses the one end of the second elastic member to the other direction. As a result, the second elastic member is tightened to each of the outer peripheries of the outer diameter portion of the output member and the fixed shaft of the fixed member, and the rotation of the output member is locked. At this time, the locking portion is not brought into contact with the other circumferential end portion of the first notch portion.

The phase angle adjustment of the end portion of the elastic member in the reverse input lock clutch operated as above can be also made by having the rotation position of the locking portion with respect to the output member set at an arbitrary position and by fixing the stopper on the end surface of the output member by the fixing tool similarly to the configuration of the reverse input lock clutch by using the first elastic member. Therefore, the handleability of the second elastic member as a component of the reverse input lock clutch is also improved. Moreover, since the first notch portion and the third notch portion as well as the engagement groove are formed on one component of the input member, their mutual positional relations can be set with accuracy, and the reverse input lock clutch can be assembled regardless of the arrangement relations among components.

Moreover, the present invention is characterized in that the elastic member is formed by winding a wire material having a rectangular cross section.

According to this configuration, since each of the first and second elastic members covering each of the outer peripheries of the outer diameter portion of the output member and the fixed shaft of the fixed member has a rectangular cross section, it is not fitted into nor bite into a boundary portion between the outer periphery portion of the output member and the fixed shaft of the fixed member easily as compared with the a circular cross section.

Advantageous Effects of Invention

According to the present invention, the handleability of the elastic member as a component of the reverse input lock clutch is improved, and conventional labor such as component sorting and readjusting is no longer necessary. Moreover, the reverse input lock clutch can be assembled regardless of the arrangement relations among the components.

DESCRIPTION OF EMBODIMENTS

Subsequently, an embodiment for working a reverse input lock clutch according to the present invention will be described.

Figure 1:
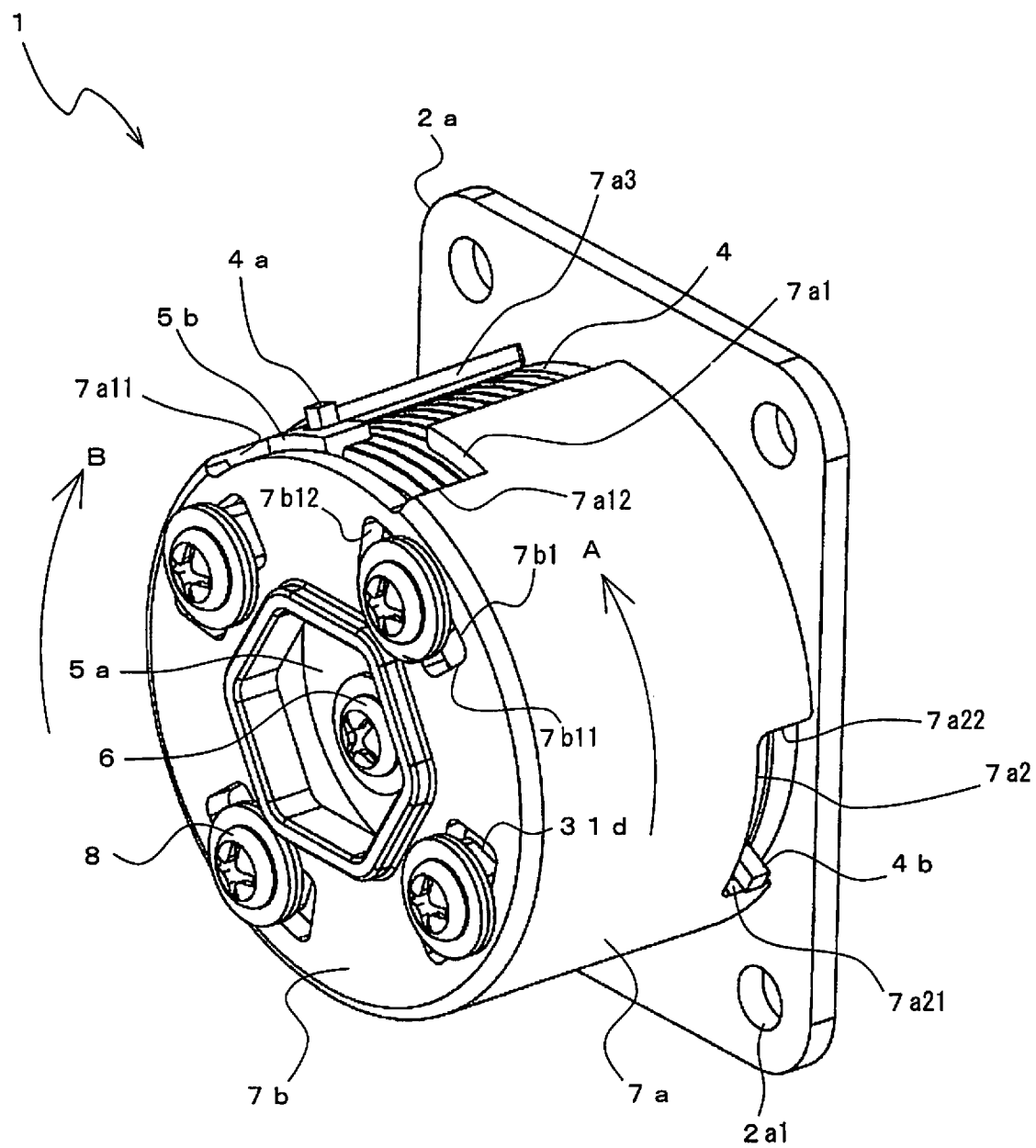
FIG. 1 is an appearance perspective view of a reverse input lock clutch according to an embodiment of the present invention.
Figure 2:
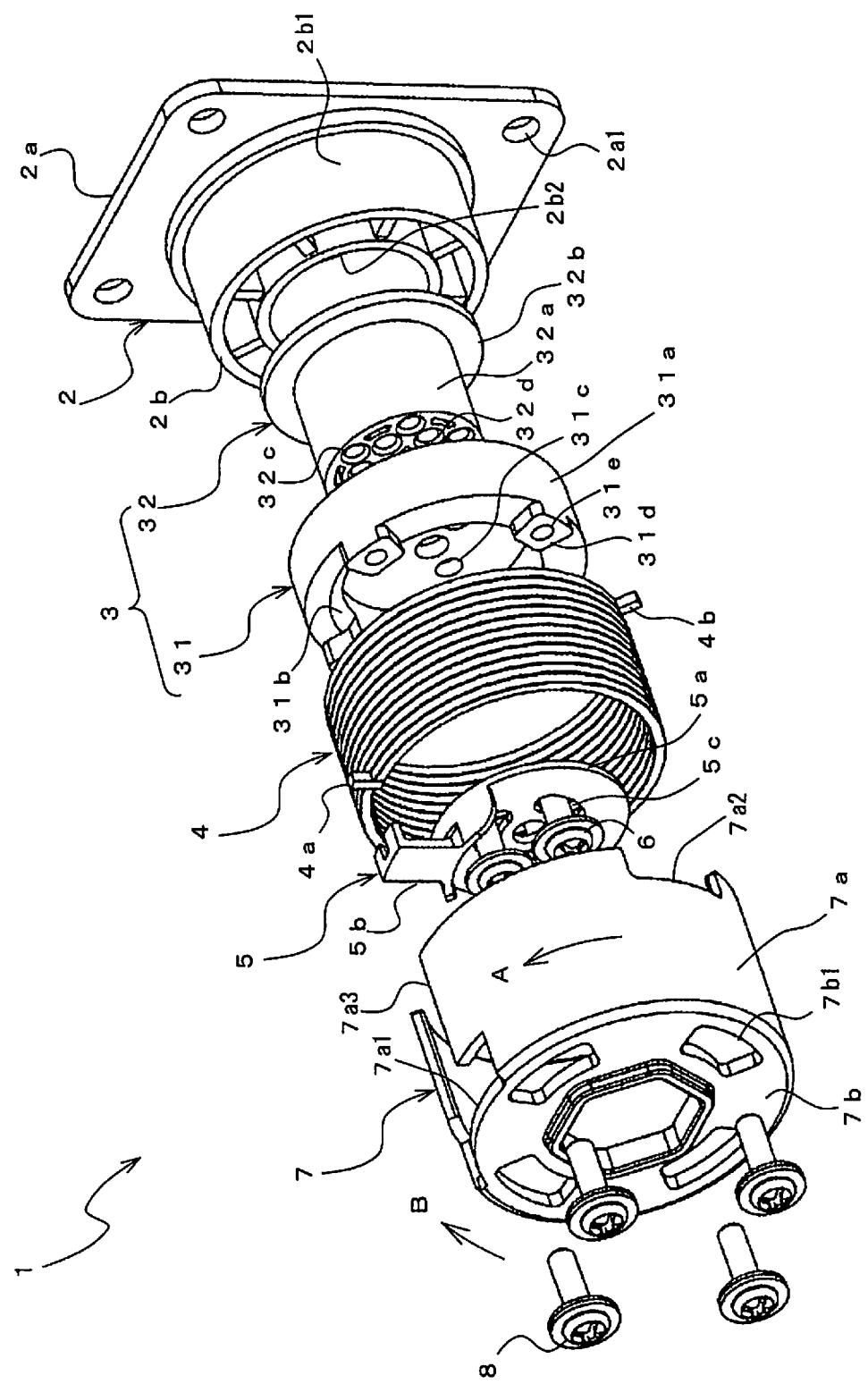
FIG. 2 is an exploded perspective view of the reverse input lock clutch according to an embodiment.
Figure 3B:
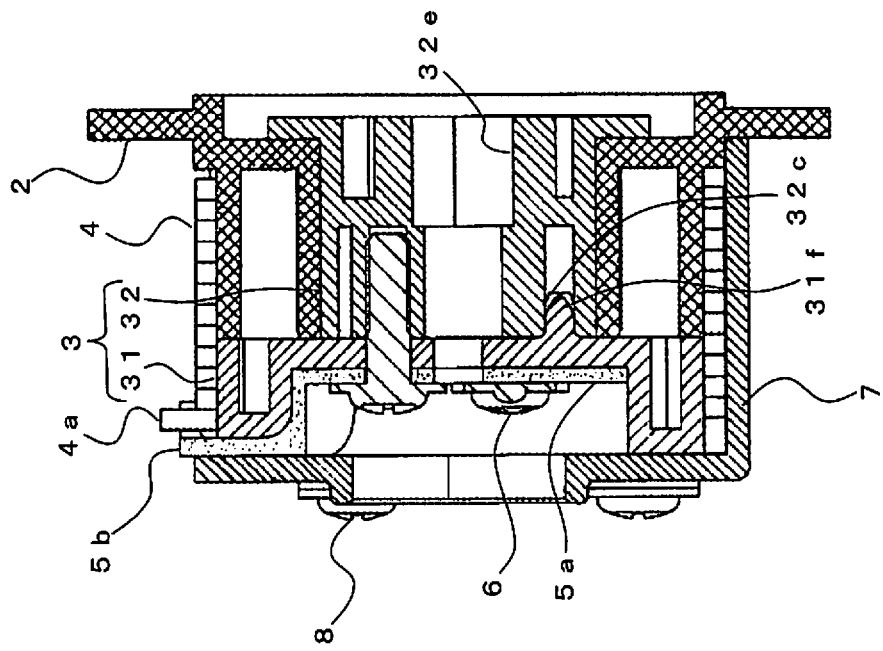
FIG. 3B is a C-C line broken arrow-view sectional view in FIG. 3A.
Figure 3A:
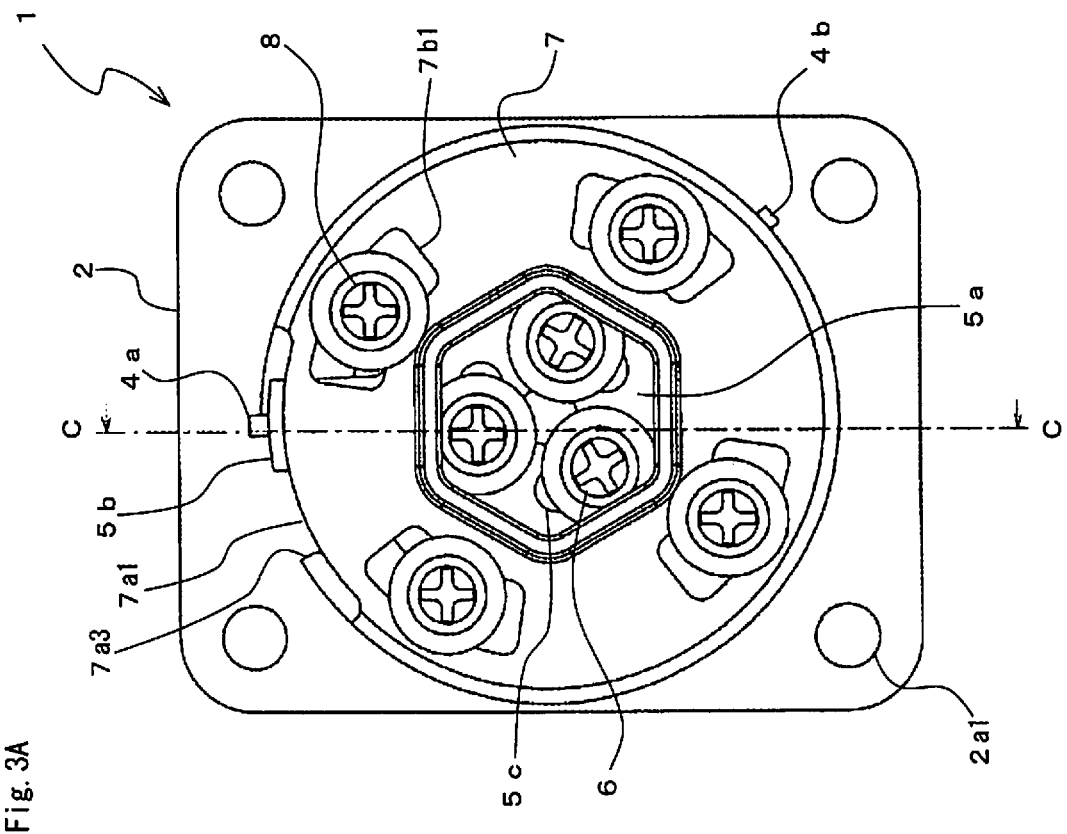
FIG. 3A is a front view of the reverse input lock clutch according to an embodiment.

FIG. 1 is an appearance perspective view of a reverse input lock clutch 1 according to an embodiment of the present invention, FIG. 2 is an exploded perspective view, FIG. 3A is a front view, and FIG. 3B is a C-C line broken arrow-view sectional view.

The reverse input lock clutch 1 is, as illustrated in FIG. 2, configured by including a fixed member 2, an output member 3, a first elastic member 4, a spring stopper 5, an adjustment pin 6, an input member 7, and a retainer pin 8. The fixed member 2 is installed fixedly and mounted on a member in an immovable state. In this state, the reverse input lock clutch 1 transmits a rotational driving force input into the input member 7 from two directions, i.e., a one direction A and the other direction B to the output member 3. Moreover, the rotational driving force reversely input into the output member 3 in a predetermined direction or in the one direction A in this embodiment is prevented from being transmitted to the input member 7.

Figure 4A:
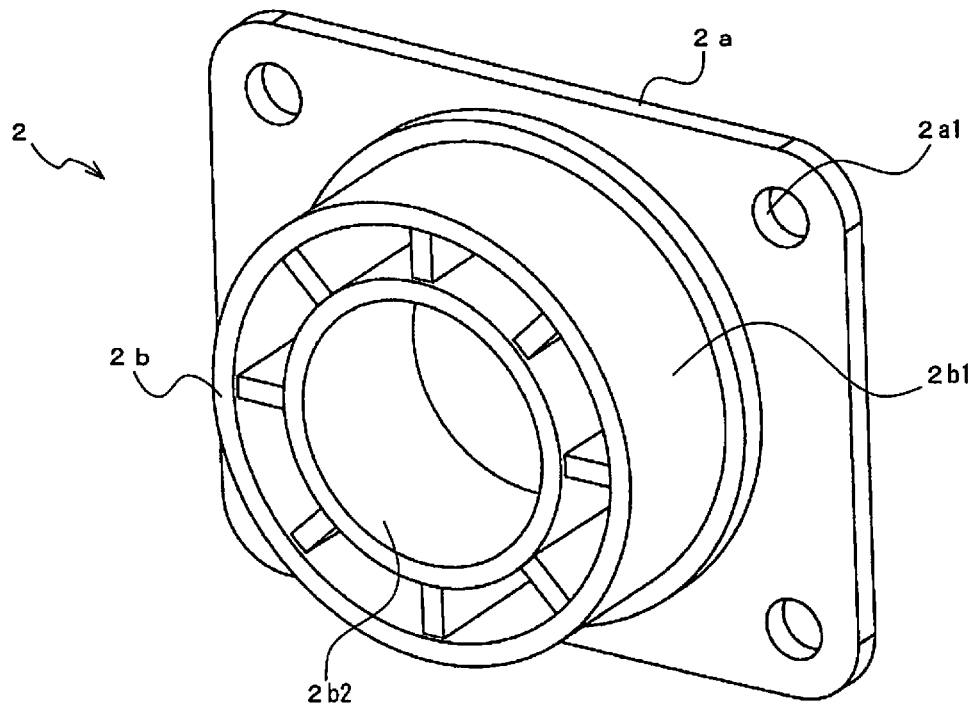
FIG. 4A is a front side appearance perspective view of a fixed member configuring the reverse input lock clutch according to an embodiment.
Figure 4B:
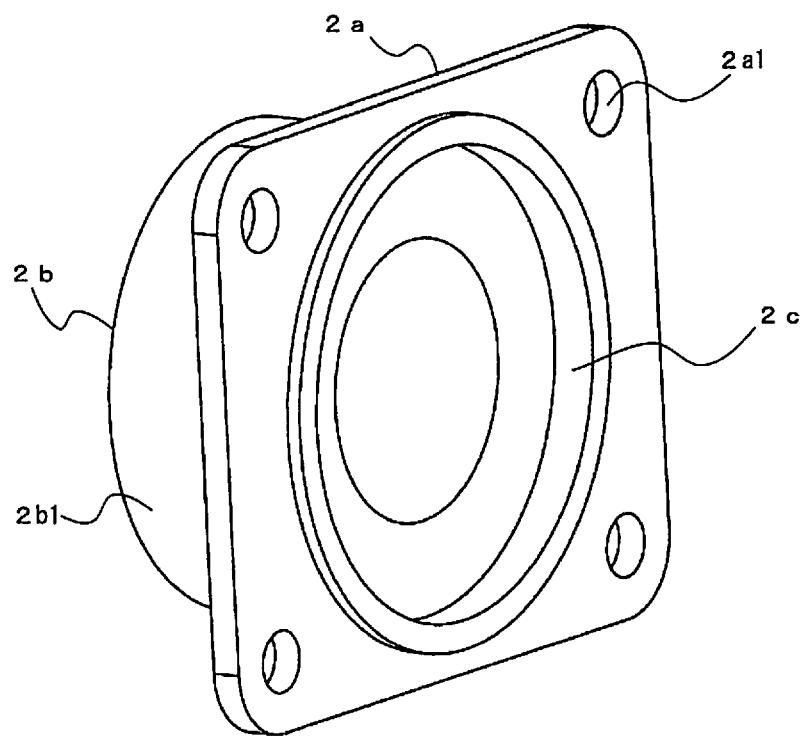
FIG. 4B is a rear surface side perspective view thereof.

FIG. 4A is a front side appearance perspective view of the fixed member 2, and FIG. 4B is a rear surface side perspective view thereof. The fixed member 2 is formed by installing a fixed shaft 2b upright on a fixed portion 2a having a rectangular plate shape. Mounting holes 2a1 are opened at four corners of the fixed portion 2a, and the fixed member 2 is fixedly installed by inserting screws or the like into the mounting holes 2a1. The fixed shaft 2b has a hollow cylindrical shape having an outer diameter portion 2b1 and an inner diameter portion 2b2, and a through hole penetrating in a shaft core direction of the fixed shaft 2b is formed on the inner diameter portion 2b2.

Figure 5A:
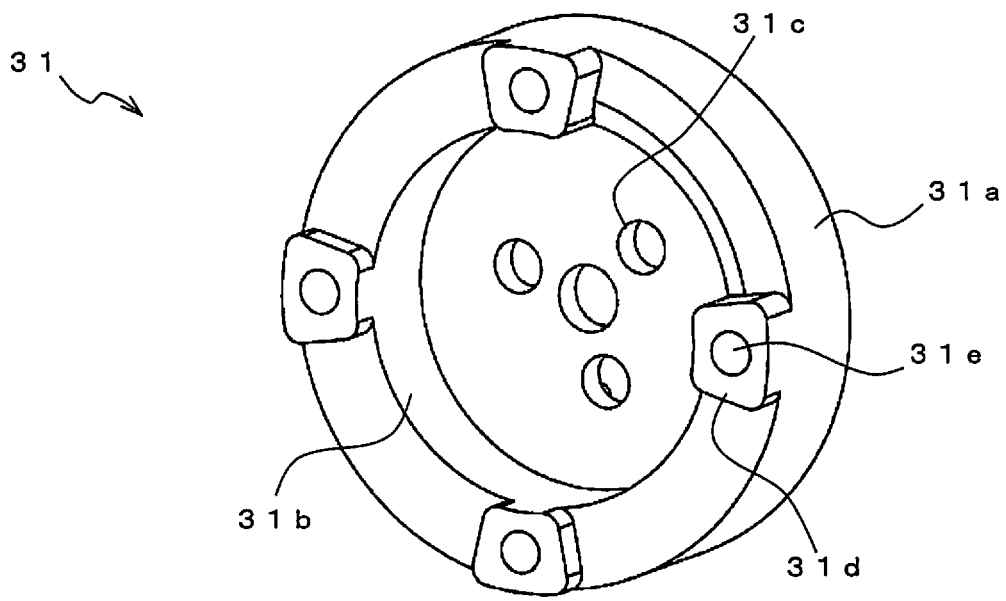
FIG. 5A is a front side appearance perspective view of a first output member configuring the reverse input lock clutch according to an embodiment.
Figure 5B:
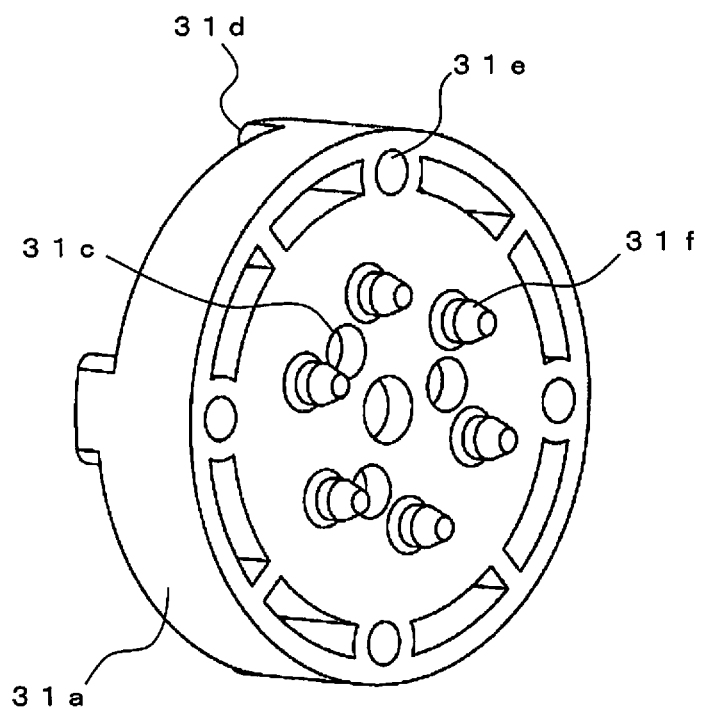
FIG. 5B is a rear surface side perspective view thereof.
Figures 6A, 6B:
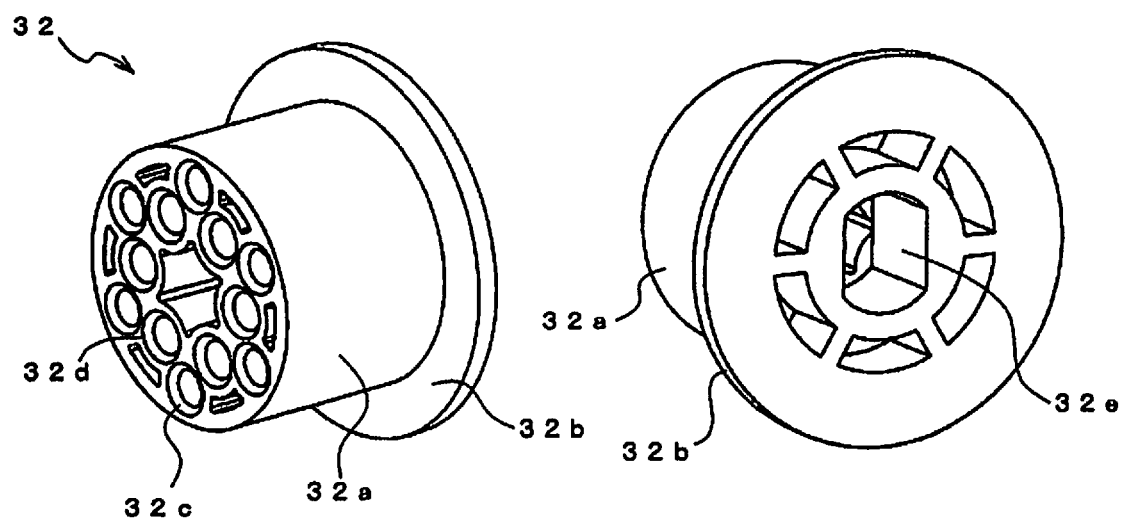
FIG. 6A is a front side appearance perspective view of a second output member configuring the reverse input lock clutch according to an embodiment.
FIG. 6B is a rear surface side perspective view thereof.

The output member 3 is configured by a first output member 31 illustrated in FIGS. 5A and 5B and a second output member 32 illustrated in FIGS. 6A and 6B.

FIG. 5A is a front side appearance perspective view of the first output member 31, and FIG. 5B is a rear surface side perspective view thereof. The first output member 31 has a cylindrical shape having an outer diameter portion 31a on an outer periphery, and a cylindrical dent surrounded by an inner diameter portion 31b is formed on the front side end surface thereof. Three insertion holes 31c through which the adjustment pins 6 are inserted are opened at an equal interval on the same circumference on a bottom surface of this cylindrical dent. A diameter of the outer diameter portion 31a is set substantially equal to the diameter of the outer diameter portion 2b1 of the fixed shaft 2b. Moreover, four protrusions 31d are formed on a peripheral edge portion of the front side end surface of the first output member 31 in a circumferential direction around a shaft core of the first output member 31. A protruding height of each of the protrusions 31d is set to a height slightly protruding from an engagement groove 7b1, which will be described later, of the input member 7 in a state illustrated in FIG. 1 in which each component has been assembled. In each of the protrusions 31d, a retainer pin fixing portion 31e to which the retainer pin 6 is fixed is opened penetrating in the shaft core direction of the first output member 31. Moreover, on the rear surface side end surface of the first output member 31, six fixed projections 31f are formed at an equal interval on the same circumference.

FIG. 6A is a front side appearance perspective view of the second output member 32, and FIG. 6B is a rear surface side perspective view thereof. The second output member 32 has a cylindrical shape having an outer diameter portion 32a on one end portion side on the front, and a flange portion 32b is formed by extending on the other end portion side of the rear surface. The outer diameter portion 32a is inserted through the through hole of the fixed shaft 2b and is pivotally supported rotatably by the inner diameter portion 2b2. The flange portion 32b extends to a retreated portion 2c (see FIG. 4B) formed on the rear surface side of the fixed member 2 and functions as a retainer which prevents the second output member 32 from passing through the through hole. Six fixed recess portions 32c into which the fixed projections 31f of the first output member 31 are inserted are formed at an equal interval on the same circumference on the end surface of the second output member 32 on the one end portion side. Moreover, six adjustment pin fixing portions 32d to which the adjustment pins 6 are fixed are formed at an equal interval on the same circumference on the inner circumference side of the fixed recess portions 32c. Moreover, a connection hole 32e retreated with an oval shape is formed on the end surface of the second output member 32 on the other end portion side. A driven member driven by the rotational driving force transmitted from the input member 7 to the output member 3 is fitted in and fixed to this connection hole 32e.

Mounting of the output member 3 to the fixed member 2 is performed by inserting the second output member 32 into the through hole of the fixed shaft 2b from the one end portion side thereof and by fixing the one end portion of the second output member 32 coming out of the through hole by the adjustment pin 6 to the first output member 31 together with the spring stopper 5. By means of this mounting, the outer diameter portion 31a of the first output member 31 is juxtaposed coaxially with the outer diameter portion 2b1 of the fixed shaft 2b. The adjustment pin 6 is passed through an adjustment groove 5c, which will be described later, of the spring stopper 5 and the through hole 31c of the first output member 31 and fixed to the adjustment pin fixing portion 32d formed on the second output member 32. When a tap-tight screw or a tapping screw is used for the adjustment pin 6, the adjustment pin 6 is screwed on the adjustment pin fixing portion 32d. When a cylindrical pin is used as the adjustment pin 6, the adjustment pin 6 is press-fit and fixed or bonded to the adjustment pin fixing portion 32d. At this fixation, fixing strength between the first output member 31 and the second output member 32 is improved by inserting each of the fixed projections 31*f* formed on the rear surface of the first output member 31 into each of the fixed recess portions 32*c* formed on the end surface on the front side of the second output member 32. By means of this fixing, the output member 3 is pivotally supported rotatably by the fixed member 2 and outputs the rotational driving force.

Figure 7A:
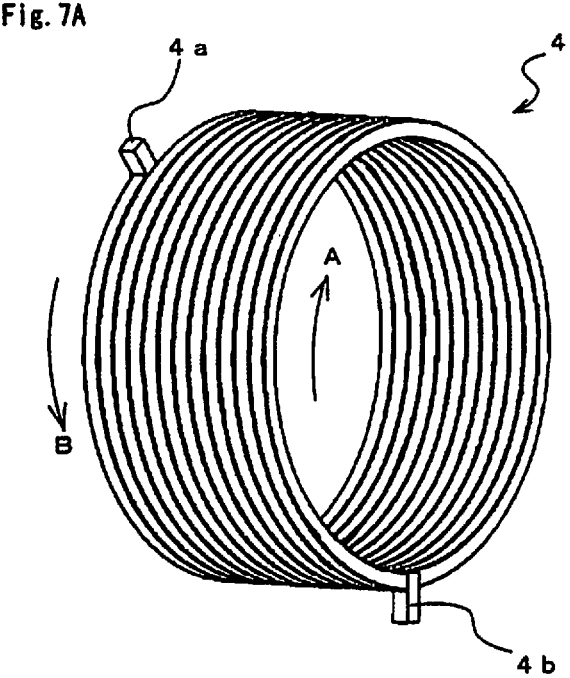
FIG. 7A is a rear surface side appearance perspective view of a first elastic member configuring the reverse input lock clutch according to an embodiment.

FIG. 7A is a rear surface side appearance perspective view of the first elastic member 4. The first elastic member 4 is made into a torsion coil spring by winding a wire material having a rectangular cross section and is loosened when the other end 4*b* is pressed to the one direction A or one end 4*a* is pressed to the other direction B. The first elastic member 4 is provided across both the fixed member 2 and the output member 3 by covering each of the outer peripheries of the outer diameter portion 31*a* of the first output member 31 and the outer diameter portion 2*b*1 of the fixed shaft 2*b*. The one end 4*a* on the end surface side of the output member 3 opposite to the fixed member 2 and the other end 4*b* on the root side of the fixed shaft 2*b* are bent so as to protrude in a radial direction from the outer periphery of the first elastic member 4. The first elastic member 4 enables rotation of the output member 3 by being loosened as will be described later and locks rotation of the output member 3 by being tightened and wound around the outer diameter portion 2*b*1 of the fixed shaft 2*b* with the outer diameter portion 31*a* of the first output member 31.

Figure 7B:
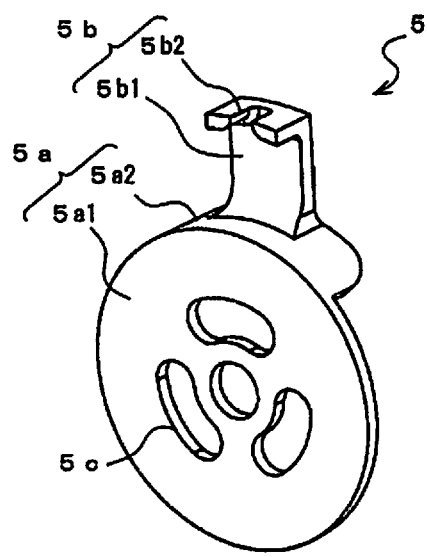
FIG. 7B is a rear surface side appearance perspective view of a spring stopper configuring the reverse input lock clutch according to an embodiment.

FIG. 7B is a rear surface side appearance perspective view of the spring stopper 5. The spring stopper 5 has a fitting portion 5*a* and a locking portion 5*b*. The fitting portion 5*a* is formed by a disc portion 5*a*1 having a disc shape and an outer diameter portion 5*a*2 extending in the axial direction from a part of an outer peripheral arc of the disc portion 5*a*1. Outer diameters of the disc portion 5*a*1 and the outer diameter portion 5*a*2 are set to have dimensions to be fitted in a cylindrical dent formed by being surrounded by the inner diameter portion 31*b* of the first output member 31, and the fitting portion 5*a* is rotatably fitted in this cylindrical dent formed on the end surface of the output member 3 on the side opposite to the fixed member 2. The locking portion 5*b* is formed by a holder portion 5*b*1 standing in the radial direction of the disc portion 5*a*1 from a protruding end of the outer diameter portion 5*a*2 and having a tip end bent in the axial direction and a holder groove 5*b*2 formed by a bent tip end of the holder portion 5*b*1 split into two parts. The one end 4*a* of the first elastic member 4 is locked by the holder groove 5*b*2, and the locking portion 5*b* rotates with the fitting portion 5*a* while having the one end 4*a* of the first elastic member 4 locked by the holder groove 5*b*2. A standing height of the holder portion 5*b*1 is set to such a height that the end portion of the holder portion 5*b*1 is surrounded by a first notch portion 7*a*1, which will be described later, of the input member 7 in a state where the reverse input lock clutch 1 illustrated in FIG. 1 is assembled. With regard to the locking portion 5*b*, the holder portion 5*b*1 passes between the adjacent protrusions 31*d* of the first output member 31 and the end portion thereof reaches the first notch portion 7*a*1.

The identical adjustment grooves 5*c* are formed at three spots on the same circumference surrounding the center of the disc portion 5*a*1 at an equal interval in the disc portion 5*a*1 of the side surface of the fitting portion 5*a* opposed to the end surface of the output member 3. Each of the adjustment grooves 5*c* is opened by a predetermined length with a curved long oval shape in the circumferential direction, and a groove width is set to a dimension for accommodating the outer diameter of the adjustment pin 6. Adjustment of the rotation position of the locking portion 5*b* with respect to the output member 3 is made by inserting the adjustment pin 6 in each of the adjustment grooves 5*c*, the insertion holes 31*c*, and the adjustment pin fixing portions 32*d* and by rotating the fitting portion 5*a* with respect to the output member 3 within a range of the groove length of the adjustment groove 5*c* in the circumferential direction. The fitting portion 5*a* is fixed to the output member 3 by anchoring the adjustment pin 6 to the adjustment pin fixing portion 32*d* at a desired rotation position. The adjustment pin 6 configures a fixing tool which sets the rotation position of the locking portion 5*b* with respect to the output member 3 to an arbitrary position and fixes the stopper 5 on the end surface of the output member 3. By means of this fixation, the spring stopper 5 is integrally rotated with the output member 3.

Figure 8A:
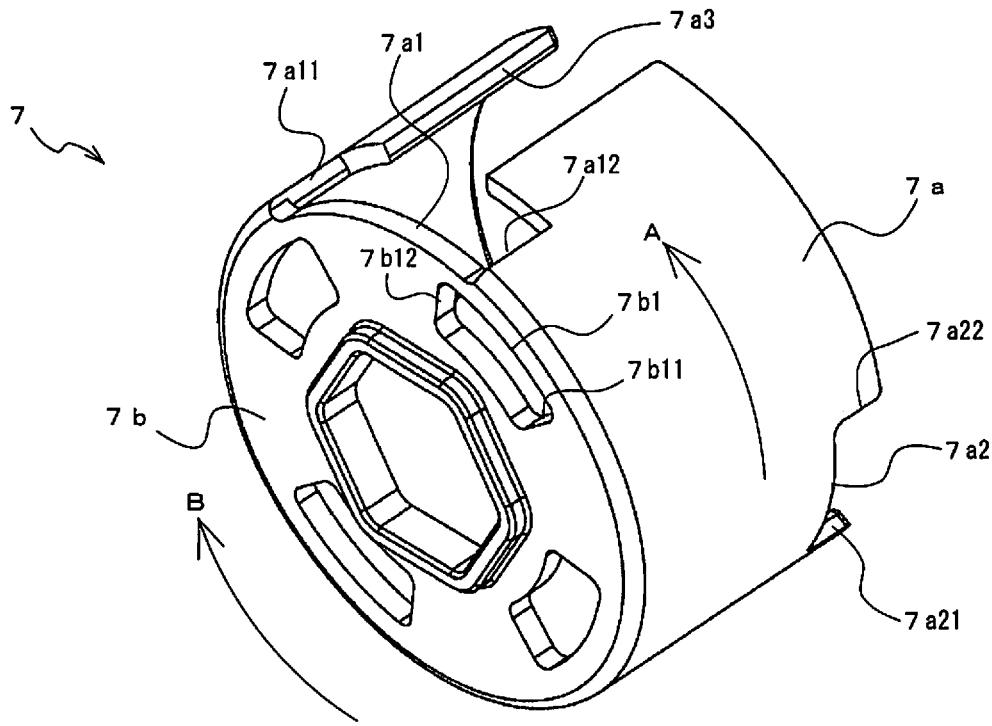
FIG. 8A is a front side appearance perspective view of an input member configuring the reverse input lock clutch according to an embodiment.
Figure 8B:
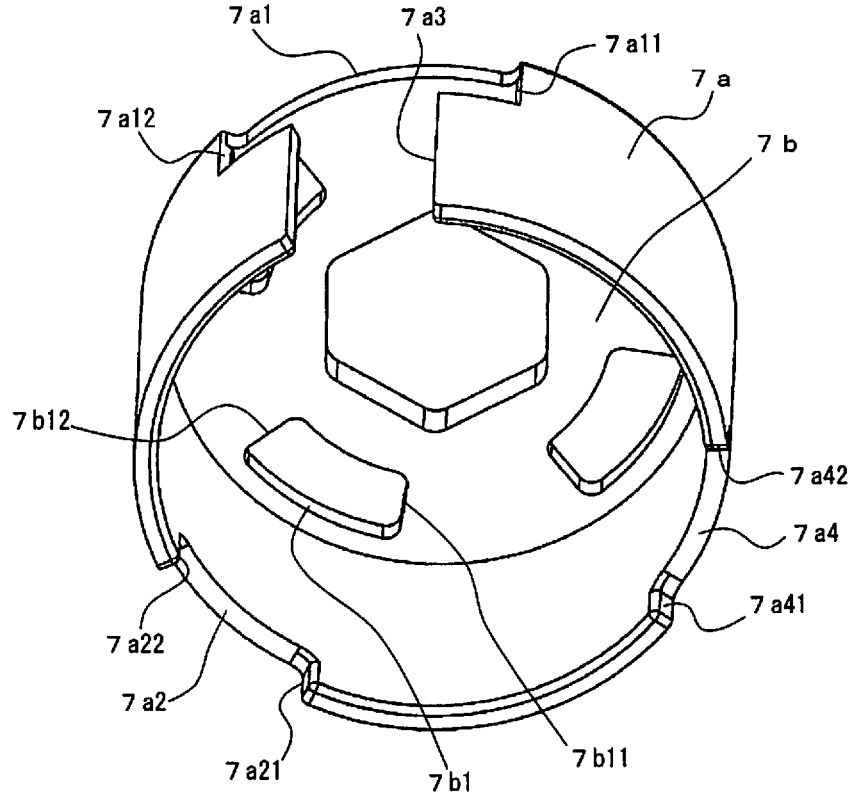
FIG. 8B is a rear surface side perspective view thereof.

FIG. 8A is a front side appearance perspective view of the input member 7, and FIG. 8B is a rear surface side perspective view.

The input member 7 has a bottomed cylindrical shape with a side peripheral wall 7*a* covering the outer periphery of the first elastic member 4, and the first notch portion 7*a*1, a second notch portion 7*a*2, and a slit 7*a*3 are formed on the side peripheral wall 7*a*. The first notch portion 7*a*1 is formed by notching a root part of the side peripheral wall 7*a* into a rectangular shape by a predetermined length in the circumferential direction around the shaft core of the input member 7 and surrounds an end portion of the locking portion 5*b* faced with this notch. The second notch portion 7*a*2 is formed by notching a distal end part of the side peripheral wall 7*a* into a rectangular shape by a predetermined length in the circumferential direction around the shaft core of the input member 7 and surrounds the other end portion 4*b* of the first elastic member 4 faced with this notch.

The slit 7*a*3 is formed by notching the side peripheral wall 7*a* from a distal end of the side peripheral wall 7*a* to the first notch portion 7*a*1 with a predetermined width in the shaft core direction of the input member 7. By means of this slit 7*a*3, when the output member 3 to which the spring stopper 5 is fixed is to be assembled to the input member 7, the locking portion 5*b* extending from a periphery of the disc portion 5*a* of the spring stopper 5 has its end portion passed through the slit 7*a*3 and is accommodated in the first notch portion 7*a*1. Therefore, the output member 3 can be assembled to the input member 7 easily without having the end portion of the locking portion 5*b* hindered by the side peripheral wall 7*a*.

Moreover, in the input member 7, the identical engagement grooves 7*b*1 are formed on the bottom surface 7*b* opposed to the end surface of the output member 3 at four spots at an equal interval on the same circumference around the shaft core of the input member 7. Each of the engagement grooves 7*b*1 is opened into a fan shape by a predetermined length in the circumferential direction, a groove width being set to a dimension for accommodating the protrusion 31*d* of the first output member 31, and surrounds the protrusion 31*d* faced with the opening. When the rotation of the output member 3 is locked, the rotation of the engagement groove 7*b*1 is restricted by the protrusion 31*d*, whereby the input member 7 rotates within a range of the groove length of the engagement groove 7*b*1 in the circumferential direction. When the rotation of the output member 3 is not locked, the engagement groove 7*b*1 is brought into contact with the protrusion 31*d* and presses the protrusion 31*d*, whereby the input member 7 transmits the input rotational driving force into the output member 3 as will be described later.

The retainer pin 8 passes through the engagement groove 7b1 and is inserted into and fixed to the retainer pin fixing portion 31e formed on the protrusion 31d. Since the protrusion 31d slightly protrudes from the engagement groove 7b1, the retainer pin 8 does not hinder rotation of the input member 7. Moreover, since a head of the retainer pin 8 extends wider than the groove width of the engagement groove 7b1, the retainer pin 8 prevents the input member 7 from going out to the shaft core direction thereof. When the tap-tight screw or tapping screw is used for the retainer pin 8, the retainer pin 8 is screwed on the retainer pin fixing portion 31e. When a cylindrical pin is used as the retainer pin 8, the retainer pin 8 is press-fit and fixed or bonded to the retainer pin fixing portion 31e.

Figure 9A:
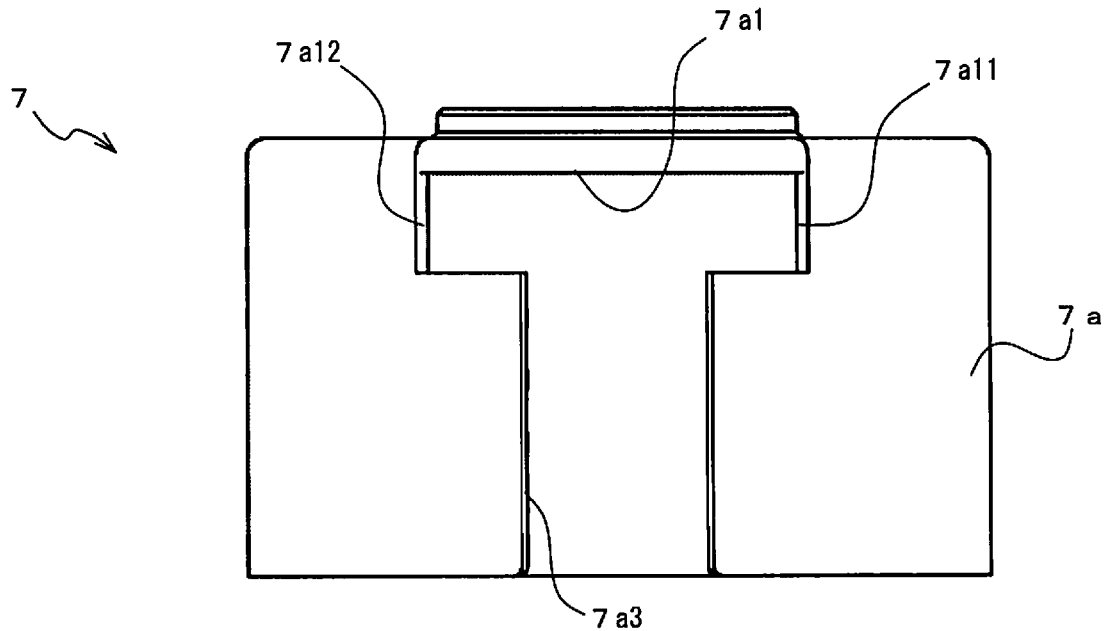
FIG. 9A is a side view of the input member illustrated in FIGS. 8A and 8B and FIG. 9B is a bottom view thereof.
Figure 9B:
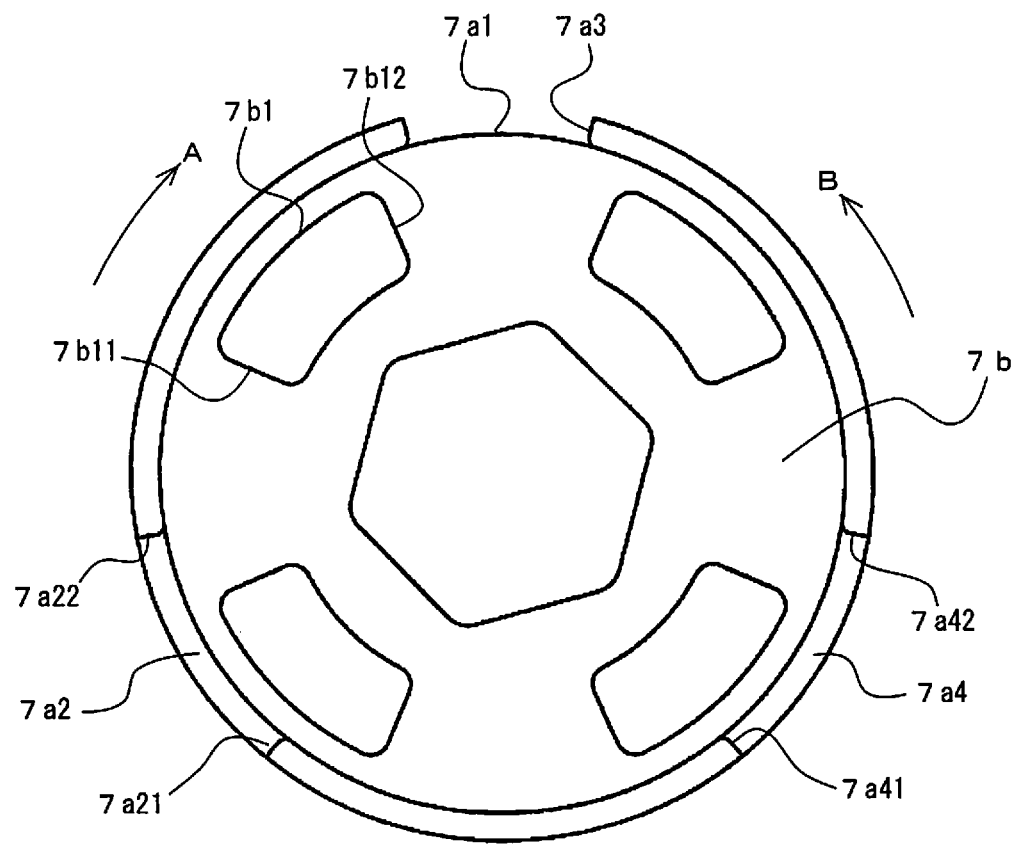

FIG. 9A is a side view of the input member 7 and FIG. 9B is a bottom view. FIGS. 9A and 9B illustrate the mutual positional relations and circumferential lengths of each of the notches of the first notch portion 7a1 and the second notch portion 7a2 and the opening of the engagement groove 7b1. Each of the notches of the first notch portion 7a1 and the second notch portion 7a2 and the opening of the engagement groove 7b1 is formed with such mutual positional relations and circumferential lengths that, when the input member 7 is rotated to the one direction A, and one circumferential end portion 7a21 of the second notch portion 7a2 is brought into contact with the other end 4b of the first elastic member 4, one circumferential end portion 7b11 of the engagement groove 7b1 is not brought into contact with the protrusion 31d, and the other circumferential end portion 7a12 of the first notch portion 7a1 is not brought into contact with the locking portion 5b. Moreover, when the input member 7 is rotated to the other direction B, and the other circumferential end portion 7b12 of the engagement groove 7b1 is brought into contact with the protrusion 31d, one end portion 7a11 of the first notch portion 7a1 is not brought into contact with the locking portion 5b, and the other circumferential end portion 7a22 of the second notch portion 7a2 is not brought into contact with the other end 4b of the first elastic member 4, or when the input member 7 is rotated to the other direction B, and the one circumferential end portion 7a11 of the first notch portion 7a1 is brought into contact with the locking portion 5b, the other circumferential end portion 7b12 of the engagement groove 7b1 is not brought into contact with the protrusion 31d, and the other circumferential end portion 7a22 of the second notch portion 7a2 is not brought into the other end 4b of the first elastic member 4.

Moreover, the reverse input lock clutch 1 of this embodiment separately provides a second elastic member, not shown, in addition to the first elastic member 4. This second elastic member is made into a torsion coil spring by winding a wire material having a rectangular cross section similarly to the first elastic member 4, but a winding direction of the wire material is opposite to that of the first elastic member 4. Thus, the second elastic member is loosened contrarily to the first elastic member 4 such that, when the other end is pressed to the other direction B or the one end is pressed to the one direction A. Moreover, the second elastic member is provided across both the fixed member 2 and the output member 3 by covering each of the outer peripheries of the outer diameter portion 31a of the first output member 31 and the outer diameter portion 2b1 of the fixed shaft 2b similarly to the first elastic member 4.

The one end of the second elastic member on the end surface side of the output member 3 opposite to the fixed member 2 and the other end on the root side of the fixed shaft 2b are bent so as to protrude in the radial direction from the outer periphery of the second elastic member. However, a phase angle of the other end with respect to the one end is different from the first elastic member 4. That is, the phase angle is formed such that the one end is surrounded by the first notch portion 7a1 similarly to the first elastic member 4, but the other end is surrounded by the third notch portion 7a4. The third notch portion 7a4 is formed on a distal end portion of the side peripheral wall 7a at a position symmetric to the second notch portion 7a2 with the first notch portion 7a1 between them as illustrated in FIGS. 8A, 8B, 9A and 9B. The second elastic member enables rotation of the output member 3 by being loosened as will be described later similarly to the first elastic member 4 and locks the reverse rotation of the output member 3 by being tightened and wound on the diameter portion 2b1 of the fixed shaft 2b with the outer diameter portion 31a of the first output member 31. The locking portion 5b of the spring stopper 5 rotates with the fitting portion 5a while having the one end of the second elastic member locked by the holder groove 5b2.

The third notch portion 7a4 is formed by notching a distal end part of the side peripheral wall 7a into a rectangular shape by a predetermined length in the circumferential direction of the side peripheral wall 7a and surrounds the other end of the second elastic member faced with this notch. Each of the notches of the first notch portion 7a1 and the third notch portion 7a4 and the opening of the engagement groove 7b1 are formed with the mutual positional relations and the circumferential lengths that, when the input member 7 is rotated to the other direction B, and one end portion 7a41 of the third notch portion 7a4 is brought into contact with the other end of the second elastic member, the other circumferential end portion 7b12 of the engagement groove 7b1 is not brought into contact with the protrusion 31d, and the one circumferential end portion 7a11 of the first notch portion 7a1 is not brought into contact with the locking portion 5b. Moreover, it is formed with the mutual positional relations and the circumferential lengths that, when the input member 7 is rotated to the one direction A, and the one circumferential end portion 7b11 of the engagement groove 7b1 is brought into contact with the protrusion 31d, the other circumferential end portion 7a12 of the first notch portion 7a1 is not brought into contact with the locking portion 5b, and the other circumferential end portion 7a42 of the third notch portion 7a4 is not brought into contact with the other end of the second elastic member, or when the input member 7 is rotated to the one direction A, and the other circumferential end portion 7a12 of the first notch portion 7a1 is brought into contact with the locking portion 5b, the one circumferential end portion 7b11 of the engagement groove 7b1 is not brought into contact with the protrusion 31d, and the other circumferential end portion 7a42 of the third notch portion 7a4 is not brought into contact with the other end of the second elastic member.

In this embodiment, the fixed member 2 is formed of a resin, the first output member 31, the second output member 32, the spring stopper 5, and the input member 7 are formed of a zinc die cast. Moreover, the first elastic member 4, the second elastic member, the adjustment pin 6, and the retainer pin 8 are formed of metal. However, these materials of each of the components are not limited to the exemplification, but arbitrary materials are selected as appropriate.

In such configuration, when the rotational driving force in the one direction A is input into the input member 7, the one circumferential end portion 7a21 of the second notch portion 7a2 formed on the side peripheral wall 7a of the input member 7 is brought into contact with the other end 4b of the first elastic member 4 and presses the other end 4b to the one direction A. As a result, the first elastic member 4 is loosened, and unlocks the output member 3. Subsequently, the one circumferential end portion 7b11 of the engagement groove 7b1 formed on the bottom surface 7b of the input member 7 is brought into contact with the side surface of the protrusion 31d formed on the output member 3 and presses the protrusion 31d to the one direction A, and the rotational driving force in the one direction A given to the input member 7 is transmitted to the output member 3. Therefore, the driven member fitted in the connection hole 32e formed on the output member 3 is rotated/driven in the one direction A. At this unlocking of the output member 3, if the rotational driving force in the one direction A is applied from the driven member to the output member 3, the rotational driving force transmitted from the input member 7 is added to the rotational driving force applied from the driven member, and the driven member is rotated to the one direction A.

Moreover, when the rotational driving force in the other direction B is input into the input member 7, the other circumferential end portion 7b12 of the engagement groove 7b1 is brought into contact with the protrusion 31d, or the one circumferential end portion 7a11 of the first notch portion 7a1 formed on the side peripheral wall 7a of the input member 7 is brought into contact with the end portion of the locking portion 5b of the spring stopper 5, and the locking portion 5b presses the one end 4a of the first elastic member 4 to the other direction B. As a result, the first elastic member 4 is loosened and unlocks the output member 3. Subsequently, the other circumferential end portion 7b12 of the engagement groove 7b1 is brought into contact with the side surface of the protrusion 31d and presses the protrusion 31d to the other direction B or the one circumferential end portion 7a11 of the first notch portion 7a1 is brought into contact with the locking portion 5b and presses the locking portion 5b to the other direction B, and the rotational driving force in the other direction B given to the input member 7 is transmitted to the output member 3. Therefore, the driven member fitted in the connection hole 32e formed on the output member 3 is rotated/driven in the other direction B. At this unlocking of the output member 3, if the rotational driving force in the one direction A is applied from the driven member to the output member 3, the driven member is rotated to the other direction B by the rotational driving force transmitted from the input member 7 and overcame the rotational driving force applied from the driven member.

On the other hand, when the rotational driving force in the one direction A is reversely input into the output member 3 from the driven member, the locking portion 5b of the spring stopper 5 fixed to the output member 3 presses the one end 4a of the first elastic member 4 to the one direction A through the holder groove 5b2. As a result, the first elastic member 4 is tightened to each of the outer peripheries of the outer diameter portion 31a of the first output member 31 and the outer diameter portion 2b1 of the fixed shaft 2b, and the rotation of the output member 3 is locked. At this time, the locking portion 5b is not brought into contact with the one circumferential end portion 7a11 of the first notch portion 7a1. Therefore, the rotational driving force is not input into the input member 7 in any direction, and when the rotational driving force in the one direction A is applied to the output member 3 from the driven member, the driven member has the rotation thereof prevented by this rotation lock of the output member 3 and keeps a stop state.

Moreover, when the rotational driving force in the other direction B is applied to the output member 3 from the driven member, the locking portion 5b of the spring stopper 5 presses the one end 4a of the first elastic member 4 to the other direction B through the holder groove 5b2. As a result, the first elastic member 4 is loosened and unlocks the output member 3. Subsequently, the side surface of the protrusion 31d presses the one circumferential end portion 7b11 of the engagement groove 7b1 to the other direction B, or the one circumferential end portion 7a11 of the first notch portion 7a1 presses the locking portion 5b to the other direction B, and the rotational driving force given to the output member 3 is transmitted to the input member 7. At this time, the locking portion 5b is not brought into contact with the other circumferential end portion 7a12 of the first notch portion 7a1. Therefore, the rotational driving force is not input into the input member 7 in any direction, and when the rotational driving force in the other direction B is applied to the output member 3 from the driven member, the rotation lock of the output member 3 is unlocked, and the input member 7 is rotated to the other direction B.

The phase angle adjustment of the end portion of the first elastic member 4 in the reverse input lock clutch 1 in this embodiment operated as above can be made by setting the rotation position of the locking portion 5b with respect to the output member 3 to an arbitrary position and by fixing the spring stopper 5 to the end surface of the output member 3 by the adjustment pin 6 as described above. Since the rotational movement of the locking portion 5b with respect to the output member 3 can be made continuously, unlike the conventional reverse input lock clutch which discretely lock the spring end portion by one of the plurality of engagement grooves disclosed in Patent Literature 1, the phase angle adjustment of the one end 4a of the first elastic member 4 locked by the locking portion 5b can be made to an arbitrary optimal rotation position.

Thus, even if the phase angle of the end portion of the first elastic member 4 or an inner diameter dimension of the first elastic member 4 is varied, the first elastic member 4 can be attached to the outer diameter portion 31a of the first output member 31 and the outer diameter portion 2b1 of the fixed shaft 2b in an optimal state by continuously adjusting the rotation position of the locking portion 5b, that is, the rotation position of the one end 4a of the first elastic member 4. Therefore, when the input member 7 is rotated to the one direction A, the other end 4b of the first elastic member 4 is reliably brought into contact with the one circumferential end portion 7a21 of the second notch portion 7a2. Moreover, when the input member 7 is rotated to the other direction B, the other end 4b of the first elastic member 4 is not brought into contact with the other circumferential end portion 7a22 of the second notch portion 7a2, but the other circumferential end portion 7b12 of the engagement groove 7b1 is reliably brought into contact with the protrusion 31d and presses the protrusion 31d. As a result, the handleability of the first elastic member 4 as a component of the reverse input lock clutch 1 is improved, and conventional labor such as component sorting and readjusting is no longer necessary.

Moreover, since the first notch portion 7a1 and the second notch portion 7a2 as well as the engagement groove 7b1 are formed on one component of the input member 7, their mutual positional relations are determined at the time when the components of the input member 7 are manufactured and can be set with accuracy. Thus, it is no longer necessary to arrange each component so that the circumferential positions of each of the notch portions of the rotation shaft and the spring receiver are shifted from each other by a predetermined length as in the conventional reverse input lock clutch disclosed in Patent Literature 1, and the reverse input lock clutch can be assembled regardless of the arrangement relations among the components.

Moreover, according to the reverse input lock clutch 1 of this embodiment, a pressing force applied to the one end 4a of the first elastic member 4 from the locking portion 5b is added to a winding force of the first elastic member 4 itself by including the spring stopper 5 at the time when reverse input is locked. Therefore, the first elastic member 4 is wound around the outer diameter portion 31a of the first output member 31 and the outer diameter portion 2b1 of the fixed shaft 2b with this strong force and integrated with them and reliably and stably locks the output member 3.

Moreover, according to the reverse input lock clutch 1 of this embodiment, the transmission of the rotational driving force between the input member 7 and the output member 3 is made at a plurality of spots by the plurality of protrusions 31d and engagement grooves 7b1 arranged in the circumferential direction and thus, it is performed stably. Moreover, the spring stopper 5 has a structure in which the locking portion 5b thereof passes between the adjacent protrusions 31d and reaches the first notch portion 7a1 and thus, a dimension occupied by the spring stopper 5 in the axial direction of the input lock clutch 1 is accommodated by the protruding height of the protrusion 31d, and the dimension of the reverse input lock clutch 1 in the axial direction can be made smaller.

Moreover, the reverse input lock clutch 1 of this embodiment separately provides the second elastic member in addition to the first elastic member 4 and moreover, the third notch portion 7a4 is formed on the side peripheral wall 7a of the input member 7. Thus, according to the reverse input lock clutch 1 of this embodiment, by configuring the reverse input lock clutch 1 by using the second elastic member instead of the first elastic member 4, when the rotational driving force in the other direction B is reversely input into the output member 3, the reverse rotation of the output member 3 can be locked. That is, when the rotational driving force in the other direction B is input into the output member 3, the locking portion 5b of the spring stopper 5 fixed to the output member 3 presses the one end of the second elastic member to the other direction B. As a result, the second elastic member is tightened to each of the outer peripheries of the outer diameter portion 31a of the first output member 31 and the outer diameter portion 2b1 of the fixed shaft 2b, and the rotation of the output member 3 is locked. At this time, the locking portion 5b is not brought into contact with the other circumferential end portion 7a12 of the first notch portion 7a1.

The phase angle adjustment of the end portion of the second elastic member in the reverse input lock clutch 1 operated as above can be also made by setting the rotation position of the locking portion 5b with respect to the output member 3 to an arbitrary position and by fixing the spring stopper 5 to the end surface of the output member 3 by the adjustment pin 6 similarly to the configuration of the reverse input lock clutch 1 by using the first elastic member 4. Therefore, the handleability of the second elastic member as a component of the reverse input lock clutch 1 is also improved. Moreover, since the first notch portion 7a1 and the third notch portion 7a4 as well as the engagement groove 7b1 are formed on one component of the input member 7, their mutual positional relations can be set with accuracy, and the reverse input lock clutch 1 can be assembled regardless of the arrangement relations among components.

Moreover, if the first elastic member 4 and the second elastic member have a circular cross section, they are fitted in and bite into the boundary portion between the outer diameter portion 31a of the first output member 31 and the fixed shaft 2b of the fixed member 3 easily. However, according to the reverse input lock clutch 1 of this embodiment, since the first elastic member 4 and the second elastic member have the rectangular cross section, it is not fitted into the boundary portion between the outer diameter portion 31a and the fixed shaft 2b easily as compared with the case of the circular cross section.

In the aforementioned embodiment, the case in which the adjustment grooves 5c are formed at three spots of the spring stopper 5 and the engagement grooves 7b1 are formed at four spots on the bottom surface 7b of the input member 7 has been described. However, the number of the adjustment grooves 5c and the engagement grooves 7b1 to be provided only needs to be one or more and it is determined as appropriate.

INDUSTRIAL APPLICABILITY

The reverse input lock clutch 1 of this embodiment can be utilized for a lifting mechanism for a clothes pole in a clothes drying device, a lifting mechanism of a shielding material in an operating device for a blind and the like.

When the reverse input lock clutch 1 of this embodiment is used for the operating device for a blind, similarly to that described in Patent Literature 1, a pulley or the like is mounted on the input member 7, and an operation cord or the like is hung around the pulley. Regarding the output member 3, a driving shaft for lifting the shielding material is mounted as a driven member at the connection hole 32 thereof. In this configuration, the operation cord is operated so as to rotate the input member 7 to the one direction A or to the other direction B, and the rotation is transmitted to the driving shaft through the output member 3 so that the shielding material can be lifted. Moreover, the rotation of the output member 3 to the one direction A or the other direction B by the weight of the shielding material can be locked by assembling the first elastic member 4 or the second elastic member to the reverse input lock clutch 1. Therefore, by setting the elevation position of the shielding material by rotating the input member 7 to the one direction A or to the other direction B to an arbitrary position and by stopping the operation to the input member 7, the shielding material keeps a state stopped at the arbitrary elevation position.

The conventional clothes drying devices include the one disclosed in Japanese Patent Laid-Open No. 2015-144713. In this clothes drying device, a pole member is mounted between wall surfaces opposed to each other, and a clothes pole is hung by a string-shaped member at both end portions of the pole member. The pole member has the both end portions fixed by pressure to the wall surfaces through pole support members, respectively, and the clothes pole is elevated with respect to the pole member by an operation of the string-shaped members. The string-shaped members are configured by a first string and a second string. The first string has a mounting end portion on one end mounted on a left end of the clothes pole, inserted through a through hole formed on the pole support member located at both end portions of the pole member and bent along the pole member, while an operation end portion of the other end is mounted on a weight on a right end side of the clothes pole. The second string has a mounting end portion on one end mounted on the right end of the clothes pole, folded back at the through hole formed on the pole support member located at the right end portion of the pole member, and an operation end portion on the other end is mounted on the weight together with the other end of the first string.

In the clothes drying device as above, the clothes pole can be raised by pulling the operation end portion of each of the first and second strings mounted on the weight downward, and the clothes pole can be lowered by lifting the operation end portion of each string upward. When the clothes pole is not in use, the clothes pole can be arranged next to the pole member by raising the clothes pole to the uppermost part by pulling the operation end portion of each string downward and by accommodating the both end portions of the clothes pole in accommodating portions formed on each of the pole support members. However, in this conventional clothes drying device, since the both end portions of the clothes pole is held in the accommodating portion when the clothes pole has been raised to the uppermost part and the both end portions thereof are accommodated in the accommodating portions, it is difficult to lower the clothes pole by operating the operation end portion of each string. Thus, the holding cannot be released unless the hand is stretched to the clothes pole held at a high position so as to pull down the clothes pole itself, which is poor in operability.

Operability of the clothes drying device as above can be improved by utilizing the reverse input lock clutch 1 in the aforementioned embodiment in the lifting mechanism thereof. That is, by mounting the pulley or the like on the input member 7 and by extending the operation cord on the pulley and the like similarly to the aforementioned blind device, the input member 7 is made capable of rotating to the one direction A or the other direction B. The driving shaft connected to the output member 3 has the operation end portion of the string-shaped member for lifting the clothes pole wound thereon. In this configuration, when the driving shaft is rotated to the one direction A, for example, and the operation end portion of the string-shaped member is wound up by the operation on the input member 7 by using the operation cord or the like, the clothes pole is raised. When the driving shaft is rotated to the other direction B, for example, and the wound string-shaped member is released, the clothes pole is lowered. Moreover, the reverse input to the other direction B, for example, to the output member 3 through the driving shaft by the weight of the clothes pole locks the output member 3 by the aforementioned lock mechanism, and the lifting position of the clothes pole can be held in a state stopped at an arbitrary position by preventing the rotational driving force for releasing the wound string-shaped member. Thus, the lift of the clothes pole can be made easily only by the operation of the string-shaped member.

REFERENCE NUMERALS 1 reverse input lock clutch
2 fixed member
2*a* fixed portion
2*b* fixed shaft
2*b*1 outer diameter portion
2*b*2 inner diameter portion
3 output member
31 first output member
31*a* outer diameter portion
31*b* inner diameter portion
31*c* insertion hole
31*d* protrusion
31*e* retainer pin fixing portion
31*f* fixed projection
32 second output member
32*a* outer diameter portion
32*b* flange portion
32*c* fixed recess portion
32*d* adjustment pin fixing portion
32*e* connection hole
4 first elastic member
4*a* one end
4*b* other end
5 spring stopper
5*a* fitting portion
5*a*1 disc portion
5*a*2 outer diameter portion
5*b* locking portion
5*b*1 holder portion
5*b*2 holder groove
5*c* adjustment groove
6 adjustment pin
7 input member
7*a* side peripheral wall
7*a*1 first notch portion
7*a*2 second notch portion
7*a*3 slit
7*a*4 third notch portion
7*b* bottom surface
7*b*1 engagement groove
7*a*11, 7*a*21, 7*a*41, 7*b*11 one circumferential end portion
7*a*12, 7*a*22, 7*a*42, 7*b*12 other circumferential end portion
A one direction
B other direction

The invention claimed is:

1. A reverse input lock clutch, comprising:
a fixed member which is fixedly provided;
an output member which is pivotally supported rotatably by the fixed member and outputs a rotational driving force;
an input member which transmits the input rotational driving force to the output member;
a first elastic member which is provided across the fixed member and the output member, enables rotation of the output member by being loosened, and locks the rotation of the output member by being tightened;
a stopper having a fitting portion rotatably fitted with an end surface of the output member on a side opposite to the fixed member and a locking portion rotating with the fitting portion while locking one end of the first elastic member; and
a fixing tool which sets a rotation position of the locking portion with respect to the output member at an arbitrary position so as to fix the stopper on the end surface of the output member,
wherein:
the fixed member has a fixed shaft installed upright, and the output member has a protrusion formed on the end surface with protruding in an axial direction of the output member and an outer diameter portion coaxially juxtaposed with the fixed shaft;
the first elastic member covers each of outer peripheries of the outer diameter portion and the fixed shaft, and protrudes from the outer periphery of the first elastic member on one end on an end surface side of the output member and on the other end on a root side of the fixed shaft so that the first elastic member is loosened when the other end is pushed to a direction or the one end is pushed to the other direction;
the input member has a bottomed cylindrical shape with a side peripheral wall covering the outer periphery of the elastic member; on the side peripheral wall, a first notch portion notched in a circumferential direction by a predetermined length and surrounding the end portion of the locking portion and a second notch portion notched in the circumferential direction by a predetermined length and surrounding the other end of the first elastic member are formed; and on a bottom surface of the input member opposed to the end surface of the output member, an engagement groove opened in the circumferential direction by a predetermined length and surrounding the protrusion is formed;

each notch of the first notch portion and the second notch portion and an opening of the engagement groove are formed with such mutual positional relations and circumferential lengths that:

when the input member is rotated to a direction and the one circumferential end portion of the second notch portion is brought into contact with the other end of the first elastic member, one circumferential end portion of the engagement groove is not brought into contact with the protrusion, and the other circumferential end portion of the first notch portion is not brought into contact with the locking portion;

when the input member is rotated to the other direction and the other circumferential end portion of the engagement groove is brought into contact with the protrusion, the one circumferential end portion of the first notch portion is not brought into contact with the locking portion, and the other circumferential end portion of the second notch portion is not brought into contact with the other end of the first elastic member; or when the input member is rotated to the other direction, and the one circumferential end portion of the first notch portion is brought into contact with the locking portion, the other circumferential end portion of the engagement groove is not brought into contact with the protrusion, and the other circumferential end portion of the second notch portion is not brought into contact with the other end of the first elastic member.

2. The reverse input lock clutch according to claim 1, wherein:

the output member has a plurality of the protrusions formed in the circumferential direction of the end surface;

the input member has a plurality of the engagement grooves surrounding each of the protrusions formed on the bottom surface; and the stopper reaches the first notch portion by the locking portion passing between the adjacent protrusions.

3. The reverse input lock clutch according to claim 1, wherein:

an adjustment groove is formed on the side surface of the fitting portion of the stopper opposed to the end surface of the output member so as to open by a predetermined length in the circumference direction; and the fixing portion is formed on the output member so as to anchor the fixing tool inserted through the adjustment groove.

4. The reverse input lock clutch according to claim 1, wherein:

a through hole is formed in a shaft core direction of the fixed shaft of the fixed member; and the output member is configured by a first output member having the outer periphery portion and the protrusion and a second output member inserted through the through hole and pivotally supported rotatably by the through hole, the second output member having one end portion fixed to the first output member by the fixing tool and another end portion formed with a retainer which prevents the second output member from passing through the through hole.

5. The reverse input lock clutch according to claim 1, wherein:

the reverse input lock clutch comprises a second elastic member formed by being wound in a direction opposite to a winding direction of the first elastic member, the second elastic member enabling rotation of the output member by being loosened when the other end is pressed to the other direction or one end is pressed to the one direction, locking reverse rotation of the output member by being tightened; covering each of outer peripheries of the outer diameter portion and the fixed shaft; and having the one end on the end surface side of the output member and the other end on the root side of the fixed shaft protruding from the outer periphery;

the locking portion of the stopper rotates with the fitting portion while locking the one end of the second elastic member;

the input member has, on the side peripheral wall, a third notch portion notched in the circumferential direction by a predetermined length and surrounding the other end of the second elastic member; and each notch of the first notch portion and the third notch portion and the opening of the engagement groove are formed with such mutual positional relations and circumferential lengths that:

when the input member is rotated to the other direction and the one circumferential end portion of the third notch portion is brought into contact with the other end of the second elastic member, the other circumferential end portion of the engagement groove is not brought into contact with the protrusion, and the one circumferential end portion of the first notch portion is not brought into contact with the locking portion;

when the input member is rotated to the one direction and the one circumferential end portion of the engagement groove is brought into contact with the protrusion, the other circumferential end portion of the first notch portion is not brought into contact with the locking portion, and the other circumferential end portion of the third notch portion is not brought into contact with the other end of the second elastic member; or when the input member is rotated to the one direction and the other circumferential end portion of the first notch portion is brought into contact with the locking portion, the one circumferential end portion of the engagement groove is not brought into contact with the protrusion, and the other circumferential end portion of the third notch portion is not brought into contact with the other end of the second elastic member.

6. The reverse input lock clutch according to claim 1, wherein the elastic member is formed by winding a wire material having a rectangular cross section.

* * * * *